US007920868B2

(12) United States Patent
Lim et al.

(10) Patent No.: US 7,920,868 B2
(45) Date of Patent: Apr. 5, 2011

(54) SYSTEM AND METHOD FOR PERFORMING A FAST HANDOVER IN A BROADBAND WIRELESS ACCESS COMMUNICATION SYSTEM

(75) Inventors: Hyoung-Kyu Lim, Seoul (KR);
Chang-Hoi Koo, Seongnam-si (KR);
Jung-Je Son, Seongnam-si (KR);
Yeong-Moon Son, Anyang-si (KR);
Hyun-Jeong Kang, Seoul (KR);
So-Hyun Kim, Suwon-si (KR);
Sung-Jin Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/541,455

(22) Filed: Aug. 14, 2009

(65) Prior Publication Data
US 2009/0296659 A1 Dec. 3, 2009

Related U.S. Application Data

(63) Continuation of application No. 11/125,028, filed on May 9, 2005, now Pat. No. 7,593,731.

(30) Foreign Application Priority Data

May 7, 2004 (KR) .................................. 2004-32394

(51) Int. Cl.
*H04W 4/00* (2009.01)
(52) U.S. Cl. ...................... 455/436; 455/432.1; 370/331
(58) Field of Classification Search .................. 455/436, 455/438, 439, 442
See application file for complete search history.

(56) References Cited

U.S. PATENT DOCUMENTS

| 5,794,149 | A | 8/1998 | Hoo |
| 5,991,629 | A | 11/1999 | Agrawal et al. |
| 6,304,755 | B1 | 10/2001 | Tiedemann et al. |
| 6,771,964 | B1 | 8/2004 | Einola et al. |
| 6,996,060 | B1 | 2/2006 | Dahlby et al. |
| 2003/0179731 | A1 | 9/2003 | Noguchi et al. |
| 2003/0225892 | A1 | 12/2003 | Takusagawa et al. |
| 2005/0101328 | A1 | 5/2005 | Son et al. |
| 2006/0099952 | A1 | 5/2006 | Prehofer |

FOREIGN PATENT DOCUMENTS

| EP | 1 326 462 | 7/2003 |
| JP | 2002-185998 | 6/2002 |
| JP | 2003-348007 | 12/2003 |

(Continued)

OTHER PUBLICATIONS

Kim et al., "Overall HO Procedures for IEEE 802.16", IEEE 802.16 Broadband Wireless Access Working Group, Sep. 4, 2003.

(Continued)

*Primary Examiner* — Nick Corsaro
*Assistant Examiner* — Joel Ajayi
(74) *Attorney, Agent, or Firm* — The Farrell Law Firm, P.C.

(57) ABSTRACT

A broadband wireless access (BWA) communication system includes a mobile subscriber station (MSS), a serving base station (BS) with which the MSS performs communication, and a plurality of neighbor BSs. The serving BS transmits, to the MSS, a handover request message including information on at least one recommended BS to which the MSS can perform a handover, among the neighbor BSs, and indication information indicating a fast handover, and transmits, to each of the recommended BSs, a handover confirm message indicating that the MSS will perform the fast handover.

10 Claims, 8 Drawing Sheets

FOREIGN PATENT DOCUMENTS

RU   2 150 176   11/1995

OTHER PUBLICATIONS

Kim et al., "IEEE 802.16e Reporting of Scanning Result", IEEE 802.16 Broadband Wireless Access Working Group, May 13, 2003.

Kitroser, "IEEE 802.16e Handoff Draft", IEEE 802.16 Broadband Wireless Access Working Group, Mar. 13, 2003.

Lan Man Standards Committee, "Part 16: Air Interface for Fixed and Mobile Broadband Wireless Access Systems", IEEE 802.16e-03/07r5, Dec. 9, 2003.

Lan Man Standards Committee, "Part 16: Air Interface for Fixed and Broadband Wireless Access Systems", IEEE 802.16a, Apr. 1, 2003.

Hyoung Kyu Lim et al., "Enhancement to the BS-initiated Handover", IEEE 802.16 Broadband Wireless Access Working Group, May 7, 2004.

SYSTEM AND METHOD FOR PERFORMING A FAST HANDOVER IN A BROADBAND WIRELESS ACCESS COMMUNICATION SYSTEM

PRIORITY

This application is a Continuation of U.S. application Ser. No. 11/125,028, filed on May 9, 2005 now U.S. Pat. No. 7,593,731 and claims priority under 35 U.S.C. §119 to an application filed in the Korean Intellectual Property Office on May 7, 2004 and assigned Serial No. 2004-32394, the contents of which are incorporated herein by reference.

BACKGROUND OF THE INVENTION

1. Field of the Invention

The present invention relates generally to a broadband wireless access communication system, and in particular, to a system and method for performing a fast handover of a mobile subscriber station, initiated by a handover request of a serving base station.

2. Description of the Related Art

Research into a $4^{th}$ generation (4G) communication system, which is the next generation communication system, is currently being conducted to provide users with services having various Qualities-of-Service (QoSs) at a transfer rate of about 100 Mbps. More particularly, active research into the 4G communication system is being carried out to support high-speed services for guaranteeing mobility and QoS in a broadband wireless access (BWA) communication system, such as a wireless Local Area Network (LAN) system and a wireless Metropolitan Area Network (MAN) system. Conventional communication systems include an Institute of Electrical and Electronics Engineers (IEEE) 802.16a communication system and an IEEE 802.16e communication system.

The IEEE 802.16a and IEEE 802.16e communication systems use an Orthogonal Frequency Division Multiplexing (OFDM) scheme and/or an Orthogonal Frequency Division Multiple Access (OFDMA) scheme in order to support a broadband transmission network for a physical channel of the wireless MAN system. The IEEE 802.16a communication system considers only a state in which a subscriber station (SS) is located in a fixed position, i.e., mobility of an SS is never taken into consideration, and a unicell structure. However, the IEEE 802.16e communication system considers mobility of an SS in the IEEE 802.16a communication system, and accordingly, in the IEEE 802.16e communication system, the SS is called a mobile subscriber station (MSS).

FIG. 1 is a diagram schematically illustrating a conventional IEEE 802.16e communication system. Referring to FIG. 1, the IEEE 802.16e communication system has a multicell structure, i.e., a cell 100 and a cell 150, and includes a base station (BS) 110 managing the cell 100, a BS 140 managing the cell 150, and a plurality of MSSs 111, 113, 130, 151, and 153. Signal exchange between the base stations 110 and 140 and the MSSs 111, 113, 130, 151, and 153 is achieved using the OFDM/OFDMA scheme.

The MSS 130 is located in a boundary region of the cell 100 and the cell 150, i.e., a handover region. If the MSS 130, while exchanging signals with the BS 110, moves in the direction of the cell 150 managed by the BS 140, its serving BS changes from the BS 110 to the BS 140.

FIG. 2 is a signaling diagram illustrating a handover process initiated at the request of an MSS in a conventional IEEE 802.16e communication system. Referring to FIG. 2, a serving BS 210 transmits a Mobile Neighbor Advertisement (MOB_NBR_ADV) message to an MSS 200 in Step 211. A format of the MOB_NBR_ADV message is shown in Table 1.

TABLE 1

| Syntax | Size | Notes |
| --- | --- | --- |
| MOB_NBR_ADV_Message_Format( ) { | | |
| Management Message Type = 49 | 8 bits | |
| Operator ID | 24 bits | Unique ID assigned to the operator |
| N_NEIGHBORS | 8 bits | |
| For (j=0; j<N_NEIGHBORS; j++) { | | |
| Neighbor BS-ID | 48 bits | |
| Physical Frequency | 32 bits | |
| Configuration Change Count | 8 bits | Incremented each time the information for the associated neighbor BS has changed. |
| Hysteresis threshold | 8 bits | |
| MAHO report period | 8 bits | |
| TLV Encoded Neighbor information | Variable | TLV specific |
| } | | |
| } | | |

As shown in Table 1, the MOB_NBR_ADV message includes a plurality of information elements (IEs), i.e., a Management Message Type indicating a type of a transmission message, an Operator ID indicating a network identifier (ID), an N_NEIGHBORS indicating the number of neighbor BSs, a Neighbor BS-ID indicating IDs of the neighbor BSs, a Physical Frequency indicating a physical channel frequency of the neighbor BS, a Configuration Change Count indicating the number of changes in configuration, a Hysteresis threshold indicating hysteresis information, a MAHO (Mobile Assisted HandOver) report period indicating a period for which an average carrier-to-interference and noise ratio (CINR) value of a neighbor BS is reported, and a TLV (Type/Length/Value) Encoded Neighbor Information indicating other information related to the neighbor BS.

The MSS 200 can acquire information on neighbor BSs by receiving the MOB_NBR_ADV message. If the MSS 200 desires to scan CINRs of pilot channel signals transmitted from neighbor BSs and the serving BS 210, it transmits a Mobile Scanning Interval Allocation Request (MOB_SCN_REQ) message to the serving BS 210 in Step 213. A format of the MOB_SCN_REQ message is shown in Table 2.

TABLE 2

| Syntax | Size | Notes |
| --- | --- | --- |
| MOB_SCN_REQ_Message_Format( ) { | | |
| Management Message Type = 50 | 8 bits | |
| Scan Duration | 12 bits | Units are frames |
| reserved | 4 bits | |
| } | | |

As shown in Table 2, the MOB_SCN_REQ message includes a plurality of IEs, i.e., a Management Message Type indicating a type of a transmission message, and a Scan Duration indicating a scanning duration for which the MSS 200 desires to scan CINRs of pilot channel signals received from the neighbor BSs. Because a time at which the MSS 200 makes a scan request is not directly related to a CINR scanning operation for the pilot channel signals, a detailed description thereof will not be given herein.

Upon receiving the MOB_SCN_REQ message, the serving BS 210 includes information based on which the MSS 200 will perform scanning in a Mobile Scanning Interval Allocation Response (MOB_SCN_RSP) message with Scan Durations≠0, and transmits the MOB_SCN_RSP message to the MSS 200 in Step 215. A format of the MOB_SCN_RSP message is shown in Table 3.

TABLE 3

| Syntax | Size | Notes |
|---|---|---|
| MOB_SCN_RSP_Message_Format( ) { | | |
| Management Message Type = 51 | 8 bits | |
| CID | 16 bits | basic CID of the MSS |
| Duration | 12 bits | in frames |
| Start Frame | 4 bits | |
| } | | |

As shown in Table 3, the MOB_SCN_RSP message includes a plurality of IEs, i.e., a Management Message Type indicating a type of a transmission message, a Connection ID (CID) indicating a CID of the MSS 200 that transmitted the MOB_SCN_REQ message, a Scan Duration, and a Start Frame indicating a time at which a scanning operation starts. The Scan Duration indicates a scanning duration for which the MSS 200 performs the pilot CINR scanning, and if the Scan Duration is set to '0' (Scan Duration=0), it indicates that the scan request of the MSS 200 is rejected by an SS.

Upon receiving the MOB_SCN_RSP message including the scanning information, the MSS 200 performs CINR scanning on the pilot channel signals received from the serving BS 210 and neighbor BSs acquired through reception of the MOB_NBR_ADV message according to parameters, i.e., Scan Duration, included in the MOB_SCN_RSP message in Step 217.

After completing CINR scanning on the pilot channel signals received from the neighbor BSs and the serving BS 210, the MSS 200 determines if it should change its current serving BS to a new serving BS, which is different from the serving BS 210, in Step 219.

When the MSS 200 determines to changes its current serving BS, it transmits a Mobile Subscriber Station Handover Request (MOB_MSSHO_REQ) message to the serving BS 210 in Step 221. Herein, a new BS other than the serving BS to which the MSS 200 currently belongs, i.e., a possible new serving BS to which the MSS 200 will be handed over, will be referred to as a "target BS."

A format of the MOB_MSSHO_REQ message is shown in Table 4.

TABLE 4

| Syntax | Size | Notes |
|---|---|---|
| MOB_MSSHO_REQ_Message_Format( ) { | | |
| Management Message Type = 53 | 8 bits | |
| For (j=0; j<N_Recommended; j++) { | | N_Recommended can be derived from the known length of the message |
| Neighbor BS-ID | 48 bits | |
| BS CINR mean | 8 bits | |
| Service level prediction | 8 bits | |
| } | | |
| Estimated HO start | 8 bits | The estimated HO time shall be the time for the recommended target BS. |
| } | | |

As shown in Table 4, the MOB_MSSHO_REQ message includes a plurality of IEs, i.e., a Management Message Type indicating a type of a transmission message and the scanning results acquired by the MSS 200. In Table 4, an N_Recommended indicates the number of neighbor BSs that transmitted pilot channel signals of which CINRs are higher than or equal to a predetermined CINR, as a result of CINR scanning on the pilot channel signals from the neighbor BSs by the MSS 200. That is, the N_Recommended indicates the number of recommended neighbor BSs to which the MSS 200 can be handed over.

The MOB_MSSHO_REQ message also includes a Neighbor BS-ID indicating IDs of neighbor BSs indicated by the N_Recommended, a BS CINR mean, which indicates an average CINR for pilot channel signals from the neighbor BSs, a Service level prediction indicating a service level predicted to be provided to the MSS 200 by the neighbor BSs, and an Estimated HO start indicating a time at which the MSS 200 will start handover.

Upon receiving the MOB_MSSHO_REQ message transmitted by the MSS 200, the serving BS 210 detects a list of candidate target BSs to which the MSS 200 can be handed over, from N_Recommended information in the received MOB_MSSHO_REQ message in Step 223. Herein, the list of candidate target BSs to which the MSS 200 can be handed over will be referred to as a "candidate target BS list," and it will be assumed in FIG. 2 that the candidate target BS list has a first target BS 220 and a second target BS 230. The candidate target BS list can also include a plurality of target BSs, in addition to the two target BSs.

The serving BS 210 transmits HO_PRE_NOTIFICATION messages to the target BSs included in the candidate target BS list, i.e., the first target BS 220 and the second target BS 230 in Steps 225 and 227. A format of the HO_PRE_NOTIFICATION message is shown in Table 5.

TABLE 5

| Field | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   Estimated Time to HO | 16-bit | In milliseconds, relative to the time stamp. A value of 0 indicates that the estimated time is unknown. |
|   Required BW | 8-bit | Bandwidth which is required by MSS (to guarantee minimum packet data transmission) |
|   For (i=0; i<Num_SFID_Records; i++) { | | |
|     SFID | 32-bit | |
|     For (i=0; i<Num_QoS_Records;i++) { | | |
|     Required QoS | Variable | 11.13 QoS Parameter definition encodings that in combination define an AdmittedQoSParamSet specific to the SFIC |
|     } | | |
|   } | | |
| } | | |
| Security field | TBD | A means to authenticate this message |

As shown in Table 5, the HO_PRE_NOTIFICATION message includes a plurality of IEs, i.e., a Global Header which is commonly included in messages exchanged between BSs in a backbone network, an MSS ID of the MSS 200 that desires to be handed over to the first target BS 220 or the second target BS 230, an Estimated Time to HO indicating an estimated time at which the MSS 200 will start handover, a Required BW indicating information on a bandwidth for which the MSS 200 requests a target BS which will become a new serving BS, an SFID indicating an ID of a service flow that the MSS 200 is receiving, and a Required QoS indicating information on a service level for each SFID. The bandwidth (BW) and the service level (QoS) requested by the MSS 200 are equal to the predicted service level information recorded in the MOB_MSSHO_REQ message described in Table 4.

A format of the general Global Header commonly included in messages exchanged between BSs in a backbone network, like the HO_PRE_NOTIFICATION message, is shown in Table 6.

TABLE 6

| Field | Size | Notes |
|---|---|---|
| Message Type = ? | 8-bit | |
| Sender BS-ID | 48-bit | Base station unique identifier (Same number as that broadcasted on the DL-MAP message) |
| Target BS-ID | 48-bit | Base station unique identifier (Same number as that broadcasted on the DL-MAP message) |
| Time Stamp | 32-bit | Number of milliseconds since midnight GMT (set to 0xffffffff to ignore) |
| Num Records | 16-bit | Number of MSS identity records |

As shown in Table 6, the Global Header includes a plurality of IEs, i.e., a Message Type indicating a type of a transmission message, a Sender BS-ID indicating a transmission BS that transmits the transmission message, a Target BS-ID indicating a reception BS that receives the transmission message, and a Num Records indicating the number of MSSs corresponding to records included in the transmission message.

Upon receiving the HO_PRE_NOTIFICATION messages from the serving BS 210, the first target BS 220 and the second target BS 230 transmit HO_PRE_NOTIFICATION_RESPONSE messages to the serving BS 210 in response to the HO_PRE_NOTIFICATION messages in Steps 229 and 231. A format of the HO_PRE_NOTIFICATION_RESPONSE message is shown in Table 7.

TABLE 7

| Field | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   BW Estimated | 8-bit | Bandwidth which is provided by BS (to guarantee minimum packet data transmission) TBD how to set this field |
|   QoS Estimated | 8-bit | Quality of Service level Unsolicited Grant Service (UGS) Real-time Polling Service (rtPS) Non-real-time Polling Service (nrtPS) Best Effort |
| } | | |
| Security Field | TBD | A means to authenticate this message |

As shown in Table 7, the HO_PRE_NOTIFICATION_RESPONSE message includes a plurality of IEs, i.e., a Global Header which is commonly included in messages exchanged between BSs in a backbone network, an MSS unique ID of the MSS 200 that desires to be handed over to the target BSs, and bandwidth and service level information for indicating a bandwidth and a service level supportable by the target BSs to which the MSS 200 is handed over.

Upon receiving the HO_PRE_NOTIFICATION_RESPONSE messages from the first target BS 220 and the second target BS 230, the serving BS 210 analyzes the HO_PRE_NOTIFICATION_RESPONSE messages received from the first target BS 220 and the second target BS 230, and selects a target BS that can optimally support the bandwidth and service level requested by the MSS 200 after handover, as a final target BS to which the MSS 200 will be handed over. For example, if it is assumed that a service level supportable by the first target BS 220 is lower than the service level requested by the MSS 200 and a service level supportable by the second target BS 230 is higher than or equal to the service level requested by the MSS 200, the serving BS 210 selects the second target BS 230 as a final target BS to which the MSS 200 will be handed over. Therefore, the serving BS 210 transmits a HO_CONFIRM message to the second target BS 230 in response to the HO_PRE_NOTIFICATION_RESPONSE message in Step 233. A format of the HO_CONFIRM message is shown in Table 8.

TABLE 8

| Field | Size | Notes |
|---|---|---|
| Global Header | 152-bit | |
| For (j=0; j<Num Records; j++) { | | |
| MSS unique identifier | 48-bit | 48-bit universal MAC address of the MSS (as provided to the BS on the RNG-REQ message) |
| BW Estimated | 8-bit | Bandwidth which is provided by BS (to guarantee minimum packet data transmission) TBD how to set this field |
| QoS Estimated | 8-bit | Quality of Service Level Unsolicited Grant Service (UGS) Real-time Polling Service (rtPS) Non-real-time Polling Service (nrtPS) Best Effort Service (BE) |
| } | | |
| Security field | TBD | A means to authenticate this message |

As shown in Table 8, the HO_CONFIRM message includes a plurality of IEs, i.e., a Global Header which is commonly included in messages exchanged between BSs in a backbone network as described with reference to Table 6, an MSS ID of the MSS 200 that desires to be handed over to the selected target BS, and bandwidth and service level information for indicating a bandwidth and a service level supportable by the selected target BS to which the MSS 200 is handed over.

In addition, the serving BS 210 transmits a Mobile BS Handover Response (MOB_BSHO_RSP) message to the MSS 200 in response to the MOB_MSSHO_REQ message in Step 235. Herein, the MOB_BSHO_RSP message includes information on a target BS to which the MSS 200 will be handed over. A format of the MOB_BSHO_RSP message is shown in Table 9.

TABLE 9

| Syntax | Size | Notes |
|---|---|---|
| MOB_BSHO_RSP_Message_Format( ) { | | |
| Management Message Type = 54 | 8 bits | |
| Estimated HO time | 8 bits | |
| For (j=0; j<N_Recommended; j++) { | | Neighbor base stations shall be presented in an order such that the first presented is the one most recommended and the last presented is the least recommended. N_Recommended can be derived from the known length of the message. |
| Neighbor BS-ID | 48 bits | |
| service level prediction | 8 bits | |
| } | | |
| } | | |

As shown in Table 9, the MOB_BSHO_RSP message includes a plurality of IEs, i.e., a Management Message Type indicating a type of a transmission message, an Estimated HO time indicating an estimated time at which a handover process will start, and information on target BSs selected by the serving BS. In addition, an N_Recommended in the MOB_BSHO_RSP message indicates the number of target BSs satisfying the bandwidth and service level requested by the MSS 200, among the target BSs in the candidate target BS list. The MOB_BSHO_RSP message includes IDs for target BSs indicated by the N_Recommended, and a predicted service level supportable to the MSS 200 by the target BSs.

Although only the information on one target BS of the second target BS 230 among the target BSs existing in the candidate target BS list is finally included in the MOB_BSHO_RSP message in FIG. 2, if there are several target BSs satisfying the bandwidth and service level requested by the MSS 200 among the target BSs existing in the candidate target BS list, information on the several target BSs is included in the MOB_BSHO_RSP message.

Upon receiving the MOB_BSHO_RSP message, the MSS 200 analyzes N_Recommended information included in the received MOB_BSHO_RSP message, and selects a target BS to which it will be handed over based on the analysis result.

After selecting the target BS, the MSS 200 transmits a Mobile Handover Indication (MOB_HO_IND) message to the serving BS 210 in response to the MOB_BSHO_RSP message in Step 237. A format of the MOB_HO_IND message is shown in Table 10.

TABLE 10

| Syntax | Size | Notes |
|---|---|---|
| MOB_HO_IND_Message_Format( ) { | | |
| Management Message Type = 56 | 8 bits | |
| reserved | 6 bits | Reserved; shall be set to zero |
| HO_IND_type | 2 bits | 00: Serving BS released 01: HO cancel 10: HO reject 11: reserved |
| Target_BS_ID | 48 bits | Applicable only when HO_IND-type is set to 00. |
| HMAC Tuple | 21 bytes | See 11.4.11 |
| } | | |

As shown in Table 10, the MOB_HO_IND message includes a plurality of IEs, i.e., a Management Message Type indicating a type of a transmission message, a HO_IND type indicating whether the MSS 200 has determined, canceled, or rejected handover to the selected final target BS, a Target_BS_ID indicating an ID of the selected final target BS when the MSS 200 determines the handover, and a HMAC (Hashed Message Authentication Code) Tuple used for authentication of the MOB_HO_IND message. The MSS 200 transmits a MOB_HO_RSP message with HO_IND_type=00 when it has determined to perform handover to the final target BS, transmits a MOB_HO_RSP message with HO_IND_type=01 when it has determined to cancel the handover to the final target BS, and transmits a MOB_HO_RSP message with HO_IND_type=10 when it has determined to reject the handover to the final target BS. Upon receiving the MOB_HO_IND message with HO_IND_type=10, the serving BS 210 updates the candidate target BS list and retransmits a MOB_BSHO_RSP message with the candidate target BS list to the MSS 200.

Upon receiving the MOB_HO_IND message with HO_IND_type=00, the serving BS 210 recognizes that the MSS 200 will perform handover to the target BS included in the MOB_HO_IND message, i.e., the second target BS 230, and releases a connection currently set up to the MSS 200 or retains the connection set up to the MSS 200 for a predetermined time until it receives a report indicating completion of the handover process from the target BS finally selected by the MSS 200, i.e., the second target BS 230, in Step 239.

After transmitting the MOB_HO_IND message to the serving BS 210, the MSS 200 performs the remaining handover operation with the second target BS 230.

FIG. 3 is a signaling diagram illustrating a handover process initiated at the request of a BS in a conventional IEEE 802.16e communication system. However, before a description of FIG. 3 is given, it should be noted that the handover initiated at the request of a BS occurs when the BS requires load sharing for dispersing its own load to neighbor BSs due to its excessive load, or when it is necessary to cope with a variation in an uplink state of an MSS.

Referring to FIG. 3, a serving BS 310 transmits a MOB_NBR_ADV message to an MSS 300 in Step 311. The MSS 300 can acquire information on neighbor BSs by receiving the MOB_NBR_ADV message.

If the serving BS 310 detects a need for handover of the MSS 300 that it is currently managing in Step 313, it transmits HO_PRE_NOTIFICATION messages to neighbor BSs in Steps 315 and 317. Herein, the HO_PRE_NOTIFICATION message includes information on a bandwidth and service level that should be supported by a target BS, which will become a new serving BS of the MSS 300. Additionally, it is assumed in FIG. 3 that the neighbor BSs of the serving BS 310 include two BSs, i.e., a first target BS 320 and a second target BS 330.

Upon receiving the HO_PRE_NOTIFICATION messages, the first target BS 320 and the second target BS 330 transmit HO_PRE_NOTIFICATION_RESPONSE messages to the serving BS 310 in response to the HO_PRE_NOTIFICATION messages, respectively, in Steps 319 and 321. The HO_PRE_NOTIFICATION_RESPONSE message includes ACK/NACK indicating if the target BSs can perform handover requested by the serving BS 310, and information on a bandwidth and service level supportable to the MSS 300.

Upon receiving the HO_PRE_NOTIFICATION_RESPONSE messages from the first target BS 320 and the second target BS 330, the serving BS 310 selects target BSs that can support the bandwidth and service level requested by the MSS 300. For example, if it is assumed that a service level supportable by the first target BS 320 is lower than the service level requested by the MSS 300 and a service level supportable by the second target BS 330 is higher than or equal to the service level requested by the MSS 300, the serving BS 310 selects the second target BS 330 as a target BS to which the MSS 300 can be handed over.

After selecting the second target BS 330 as a candidate target BS, the serving BS 310 transmits a Mobile BS Handover Request (MOB_BSHO_REQ) message including the updated candidate target BS list to the MSS 300 in Step 323. Herein, the candidate target BS list can include a plurality of target BSs. A format of the MOB_BSHO_REQ message is shown in Table 11.

TABLE 11

| Syntax | Size | Notes |
|---|---|---|
| MOB_BHSO_REQ_Message_Format( ) {<br>  Management Message Type = 52<br>  For (j=0; j<N_Recommended; j++) { | 8 bits | N_Recommended can be derived from the known length |
|     Neighbor BS-ID<br>    Service level prediction<br>  }<br>} | 48 bits<br>8 bits | of the message |

As shown in Table 11, the MOB_BSHO_REQ message includes a plurality of IEs, i.e., a Management Message Type indicating a type of a transmission message and information on the target BSs selected by the serving BS 310. In Table 11, an N_Recommended indicates the number of neighbor BSs selected as candidate target BSs by the serving BS 310, and the MOB_BSHO_REQ message includes a Neighbor BS-ID indicating IDs for the neighbor BSs indicated by the N_Recommended, and information on a bandwidth and service level supportable to the MSS 300 by the neighbor BSs.

Upon receiving the MOB_BSHO_REQ message, the MSS 300 recognizes that handover has been requested by the serving BS 310, and selects a final target BS to which it will perform handover, based on the N_Recommended information included in the MOB_BSHO_REQ message. Before selecting the final target BS, if the MSS 300 desires to scan CINRs of the pilot channel signals transmitted from the serving BS 310 and the neighbor BSs, the MSS 300 transmits a MOB_SCN_REQ message to the serving BS 310 in Step 325. Because a time at which the MSS 300 makes a scan request is not directly related to a CINR scanning operation for the pilot channel signals, a detailed description thereof will not be given herein.

Upon receiving the MOB_SCN_REQ message, the serving BS 310 transmits a MOB_SCN_RSP message including scanning information based on which the MSS 300 will perform scanning, to the MSS 300 in Step 327. Upon receiving the MOB_SCN_RSP message including the scanning information, the MSS 300 performs CINR scanning on the pilot channel signals received from neighbor BSs acquired through reception of the MOB_NBR_ADV message, candidate target BSs acquired through reception of the MOB_BSHO_REQ message, and the serving BS 310, according to parameters, i.e., Scan Duration, included in the MOB_SCN_RSP message, in Step 329.

After selecting its final candidate target BS, the MSS 300 transmits a Mobile MSS Handover Response (MOB_MSSHO_RSP) to the serving BS 310 in response to the MOB_BSHO_REQ message in Step 331. A format of the MOB_MSSHO_RSP message is shown in Table 12.

TABLE 12

| Syntax | Size | Notes |
|---|---|---|
| MOB_MSSHO_RSP_Message_Format( ) {<br>  Management Message Type = 54<br>  Estimated HO time<br>  For (j=0; j<N_Recommended; j++) { | 8 bits<br>8 bits | N_Recommended can be derived from the known length of the message |
|     Neighbor BS-ID<br>    BS S/(N+1)<br>  }<br>} | 48 bits<br>8 bits | |

As shown in Table 12, the MOB_MSSHO_RSP includes a plurality of IEs, i.e., a Management Message Type indicating a type of a transmission message, an Estimated HO time indicating an estimated time at which the handover process will start, and information on the target BSs selected by the MSS 310. In Table 12, an N_Recommended indicates the number of neighbor BSs selected as candidate target BSs by the MSS 300, and the MOB_MSSHO_RSP message includes a Neighbor BS-ID indicating IDs for the neighbor BSs indicated by the N_Recommended, and information on a service level supportable to the MSS 300 by the neighbor BSs.

Further, the MSS 400 receives an uplink_MAP (UL_MAP) message from the final target BS 450 in Step 413. The UL_MAP message includes parameters related to an uplink of the final target BS 450, and includes a Fast UL Ranging IE allocated to support fast UL ranging of the MSS 400 whose handover is being performed by the final target BS 450. The final target BS 450 allocates the Fast UL Ranging IE to the MSS 400 to minimize a possible delay caused by handover. Therefore, the MSS 400 can perform initial ranging with the final target BS 450 on a contention-free basis according to the Fast UL Ranging IE. A format of the Fast UL Ranging IE included in the UL_MAP message is shown in Table 13.

TABLE 13

| Syntax | Size | Notes |
|---|---|---|
| Fast_UL_ranging IE { | | |
| Extended UIUC | 4 bits | |
| MAC address | 48 bits | MSS MAC address as provided on the RNG_REQ message on initial system entry |
| UIUC | 4 bits | UIUC ≠ 15. A four-bit code used to define the type of uplink access and the burst type associated with that access. |
| OFDM Symbol offset | 10 bits | The offset of the OFDM symbol in which the burst starts, the offset value is defined in units of OFDM symbols and is relevant to the Allocation Start Time field given in the UL-MAP message. |
| Subchannel offset | 6 bits | The lowest index OFDMA subchannel used for carrying the burst, starting from subchannel 0. |
| No. OFDM symbols | 10 bits | The number of OFDM symbol that are used to carry the UL Burst |
| No. Subchannels | 6 bits | The number of OFDMA subchannels with subsequent indexes, used to carry the burst. |
| Reserved | 4 bits | |
| } | | |

The serving BS 310 transmits a HO_CONFIRM message to the neighbor BS selected as the final target BS by the MSS 300 in response to the HO_PRE_NOTIFICATION_RESPONSE message in Step 333. After selecting the final target BS, the MSS 300 transmits a MOB_HO_IND message with HO_IND_type=00 to the serving BS 310 in Step 335.

Upon receiving the MOB_HO_IND message with HO_IND_type=00, the serving BS 310 re-recognizes that the MSS 300 will perform handover to the final target BS included in the MOB_HO_IND message, and then releases a connection currently set up to the MSS 300 or retains the connection set up to the MSS 300 for a predetermined time, until it receives a report indicating completion of the handover process from the finally selected target BS, i.e., the second target BS 330, in Step 337.

After transmitting the MOB_HO_IND message to the serving BS 310, the MSS 300 performs the remaining handover operation with the second target BS 330.

FIG. 4 is a signaling diagram illustrating a network re-entry process performed after a handover of an MSS in a conventional IEEE 802.16e communication system. Referring to FIG. 4, as an MSS 400 changes its connection to a final target BS 450, acquires downlink synchronization with the final target BS 450, and receives a downlink_MAP (DL_MAP) message from the final target BS 450 in Step 411. Herein, the DL_MAP message includes parameters related to a downlink of the final target BS 450.

In Table 13, Fast_UL_ranging_IE( ) includes a Medium Access Control (MAC) address of an MSS that will be provided with ranging opportunity, an Uplink Interval Usage Code (UIUC) providing information on a field in which a start offset value for the Fast_UL_ranging_IE( ) is recorded, an offset of and the number of symbols in a contention-free-based ranging opportunity interval allocated to the MSS 400, and the number of subchannels. A MAC address of the MSS 400 has been reported to the final target BS 450 through messages exchanged between a serving BS and a target BS in a backbone network in the handover process described with reference to FIGS. 2 and 3, e.g., the HO_PRE_NOTIFICATION/HO_PRE_NOTIFICATION_RESPONSE/HO_CONF IRM messages.

Upon receiving the UL_MAP message, the MSS 400 transmits a Ranging Request (RNG_REQ) message to the final target BS 450 according to the Fast UL Ranging IE in Step 415. Upon receiving the RNG_REQ message, the final target BS 450 transmits a Ranging Response (RNG_RSP) message including information used for correcting frequency, time and transmission power for the ranging, to the MSS 400 in Step 417.

After completing the initial ranging, the MSS 400 and the final target BS 450 perform a re-authorization operation on the MSS 400 (MSS RE-AUTHORIZATION) in Step 419. In the re-authorization operation, if there is no change in security context exchanged between an old (or former) serving BS of the MSS 400 and the final target BS 450, the final target BS 450 uses the security context intact. A format of an MSS Information Response (MSS_INFO_RSP) message, which is a backbone network message for providing security context information of the MSS 400, is shown in Table 14.

TABLE 14

| Fields | Size | Notes |
| --- | --- | --- |
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   N_NSIE | | Number of Network Service Information Elements |
|   For (k=0; k<N_NSIE; k++) { | | |
|     Field Size | 16-bit | Size, in bytes, of TLV encoded information field below |
|     TLV encoded information | Variable | TLV information as allowed on a DSA-REQ MAC message |
|   } | | |
|   N_SAIE | | Number of Security Associated Information Elements |
|   For (k=0; k<N_SAIE; k++) { | | |
|     Field Size | 16-bit | Size, in bytes, of TLV encoded information field below |
|     TLV encoded information | Variable | TLV information as allowed on a PKM-xxx MAC message |
|   } | | |
|   N_MSS_CAP | | Number of MSS Capabilities |
|   For (k=0; k<N_MSS_CAP; k++) { | | |
|     Field Size | 16-bit | Size, in bytes, of TLV encoded information field below |
|     TLV encoded information | Variable | TLV information as allowed on a SBC-REQ MAC message |
|   } | | |
| } | | |
| Security field | TBD | A means to authenticate this message |

In Table 14, the MSS_INFO_RSP message includes ID information of an MSS registered in a serving BS, security context information such as Security Association Information for each MSS, network service information for each MSS, and capability information of each MSS.

When the re-authentication operation for the final target BS 450 and the MSS 400 is completed, the MSS 400 transmits a Registration Request (REG_REQ) message to the final target BS 450 in Step 421. The REG_REQ message includes registration information of the MSS 400. The final target BS 450 transmits a Registration Response (REG_RSP) message to the MSS 400 in response to the REG_REQ message in Step 423. Herein, the final target BS 450 can recognize the MSS 400 as an MSS that has been handed over thereto, by detecting registration information of the MSS 400 included in the REG_REQ message received from the MSS 400. Accordingly, the final target BS 450 maps connection information in the old serving BS of the MSS 400 to connection information in the final target BS 450, and transmits to the MSS 400 the REG_RSP message including TLV values based on which a service flow that can be actually provided in the final target BS can be reset. A format of the TLV including mapping information for connection setup in the serving BS and the final target BS 450 is shown in Table 15.

TABLE 15

| Name | Type (1 byte) | Length (1 byte) | Value (Variable length) |
| --- | --- | --- | --- |
| New_CID | 2.1 | 2 | New CID after handover to new BS |
| Old_CID | 2.2 | 2 | Old CID before handover to old BS |
| Connection Info | 2.3 | Variable | If any of the service flow parameters change, then those service flow parameters and CS parameter encoding TLVs that have changed will be added. Connection_Info is a compound TLV value that encapsulates the Service Flow Parameters and the CS |

TABLE 15-continued

| Name | Type (1 byte) | Length (1 byte) | Value (Variable length) |
| --- | --- | --- | --- |
| | | | Parameter that have changed for the service. All the rules and settings that apply to the parameters when used in the DSC-RSP message apply to the contents encapsulated in this TLV. |

In Table 15, TLV included in the REG_RSP message transmitted to the MSS 400 provides CID information used in the old serving BS, before handover of the MSS 400, and CID information to be used in the final target BS 450, after handover of the MSS 400. In addition, when the final target BS 450 provides a service that is different from the service flow provided by the old serving BS before handover, the TLV includes information on the changed service parameters.

After completing the network re-entry process with the final target BS 450, the MSS 400 performs a normal communication service through the final target BS 450 in Step 425.

As described above, in the IEEE 802.16e communication system, in a handover process initiated at the request of an MSS, the MSS determines a need for handover by measuring a change in downlink channel through a scanning process and transmits a handover request message to a serving BS. In response, the serving BS receives service level prediction information for neighbor BSs recommended by the MSS and delivers the service level prediction information back to the MSS. Then the MSS can select a final target BS based on CINRs of downlink channels from the neighbor BSs and service level information of the neighbor BSs. The CINR measurement is performed before the MSS determines handover, and a message exchange for predicting a service level supportable in a backbone network is performed after the MSS determines to handover.

However, in a handover process initiated at the request of a BS, a serving BS, after determining a need for handover, should exchange messages for service level prediction with all neighbor BSs. An MSS receiving a MOB_BSHO_REQ message including a recommended-BS list should perform a scanning operation to select a final target BS among the recommended BSs. Therefore, compared with the handover process initiated at the request of an MSS, the handover process initiated at the request of a BS performs both the service level measurement and the scanning operation after the handover is determined.

It can be expected that the number of BSs recommended by an MSS through CINR values in the handover process initiated at the request of an MSS is less than the number of BSs recommended through service level prediction in the handover process initiated at the request of a BS because a time for which the MSS performs CINR scanning on each of neighbor BSs is short. Accordingly, compared with the handover process initiated at the request of an MSS, the handover process initiated at the request of a BS requires a longer processing time.

Further, a BS sends a handover request to an MSS for several reasons, especially when the BS determines that handover of the MSS is urgent. Therefore, there is a demand for a method capable of performing a handover over a shorter time by improving the handover process initiated at the request of a BS, which requires a longer processing time compared with the handover process initiated at the request of an MSS.

SUMMARY OF THE INVENTION

It is, therefore, an object of the present invention to provide a system and method, in which a mobile subscriber station (MSS) performs fast handover at the request of a base station (BS) in a broadband wireless access (BWA) communication system.

According to an aspect of the present invention, there is provided a Broadband Wireless Access (BWA) communication system. The system includes: a Mobile Subscriber Station (MSS); and a serving Base Station (BS) for transmitting, to the MSS, a handover request message including information on at least one recommended BS to which the MSS can perform handover, among a plurality of neighbor BSs of the serving BS, and an information field indicating whether a network assisted handover is supported, receiving, from the MSS, a handover indication message including an IDentifier (ID) field of a target BS, receiving information indicating a completion of a handover process of the MSS from a selected target BS determined by the MSS among the at least one recommended BS, and transmitting a notification for ordering a release of a resource allocated to the MSS, to the other at least one recommended BS, excluding the selected target BS from the at least one recommended BS. The network assisted handover indicates that the MSS may perform a handover to the selected target BS among the at least one recommended BS without notifying the serving BS of the selected target BS. The ID field of the handover indication message is set to a predefined value that does not indicate a certain target BS, when the information field indicates the network assisted handover is supported.

According to another aspect of the present invention, there is provided a Broadband Wireless Access (BWA) communication system. The system includes: a serving Base Station (BS); and a Mobile Subscriber Station (MSS) for receiving, from the serving BS, a handover request message including information on at least one recommended BS to which the MSS can perform handover, among a plurality of neighbor BSs of the serving BS, and an information field indicating whether a network assisted handover is supported, transmitting, to the serving BS, a handover indication message including an IDentifier (ID) field of a target BS, receiving, from the at least one recommended BS, a ranging resource for the network assisted handover of the MSS, transmitting, to a selected target BS among the at least one recommended BS, a ranging request message, and receiving, from the selected target BS, a ranging response message. The network assisted handover indicates that the MSS may perform a handover to the selected target BS among the at least one recommended BS without notifying the serving BS of the selected target BS. The ID field of the handover indication message is set to a predefined value that does not indicate a certain target BS, when the information field indicates the network assisted handover is supported.

According to further another aspect of the present invention, there is provided an apparatus for performing a handover of a Mobile Subscriber Station (MSS) in a serving Base Station (BS) of a Broadband Wireless Access (BWA) communication system. The apparatus includes: a transmitter for transmitting, to the MSS, a handover request message including information on at least one recommended BS to which the MSS can perform handover, from among a plurality of neighbor BSs of the serving BS, and an information field indicating whether a network assisted handover is supported; and a receiver for receiving, from the MSS, a handover indication message including an IDentifier (ID) field of a target BS, and receiving information indicating a completion of a handover process of the MSS from a selected target BS determined by the MSS among the at least one recommended BS. The transmitter transmits a notification for ordering a release of a resource allocated to the MSS, to the other at least one recommended BS, excluding the selected target BS from the at least one recommended BS. The network assisted handover indicates that the MSS may perform a handover to the selected target BS among the at least one recommended BS without notifying the serving BS of the selected target BS. The ID field of the handover indication message is set to a predefined value that does not indicate a certain target BS, when the information field indicates the network assisted handover is supported.

According to yet another aspect of the present invention, there is provided an apparatus for performing a handover in a Mobile Subscriber Station (MSS) of a Broadband Wireless Access (BWA) communication system. The apparatus includes: a receiver for receiving, from a serving Base Station (BS), a handover request message including information on at least one recommended BS to which the MSS can perform handover, from among a plurality of neighbor BSs of the serving BS, and an information field indicating whether a network assisted handover is supported; and a transmitter for transmitting, to the serving BS, a handover indication message including an IDentifier (ID) field of a target BS. The receiver receives, from the at least one recommended BS, ranging resource for the network assisted handover of the MSS, the transmitter transmits, to a selected target BS among the at least one recommended BS, a ranging request message, and the receiver receives, from the selected target BS, a ranging response message. The network assisted handover indicates that the MSS is permitted to perform a handover to the selected target BS among the at least one recommended BS without notifying the serving BS of the selected target BS. The ID field of the handover indication message is set to a predefined value that does not indicate a certain target BS, when the information field indicates the network assisted handover is supported.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention proposes a scheme for a fast handover of a mobile subscriber station (MSS) initiated at a handover request of a base station (BS) in an Institute of Electrical and Electronics Engineers (IEEE) 802.16e communication system, which is a broadband wireless access (BWA) communication system. Herein, the IEEE 802.16e communication system is a BWA communication system using an Orthogonal Frequency Division Multiplexing (OFDM) scheme and/or an Orthogonal Frequency Division Multiple Access (OFDMA) scheme. The IEEE 802.16e communication system, as it uses the OFDM/OFDMA scheme, can support high-speed data transmission by transmitting physical channel signals using a plurality of subcarriers. Further, the IEEE 802.16e communication system supports a multicell structure to support mobility of MSSs.

Figure 5:
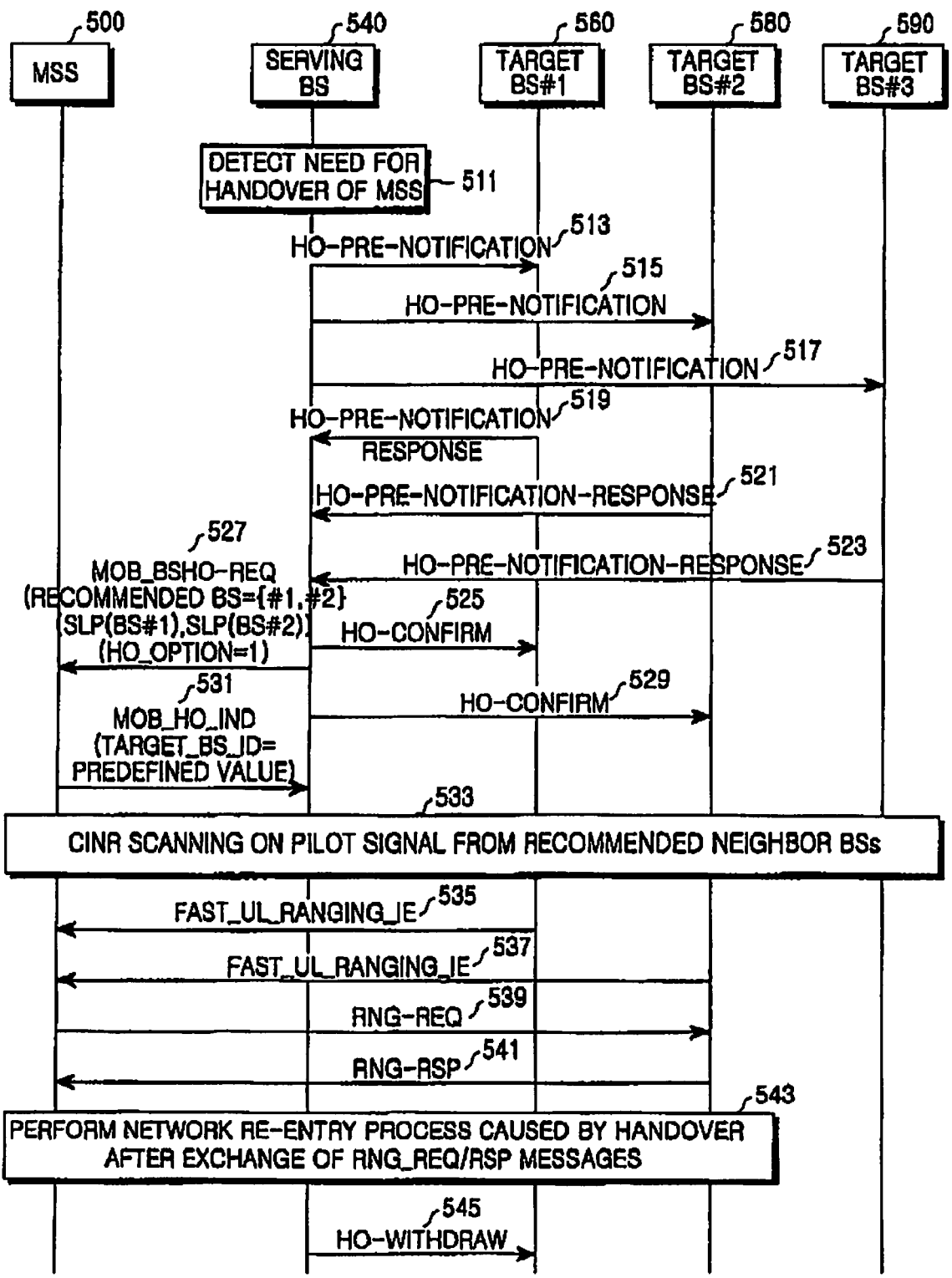
FIG. 5 is a signaling diagram illustrating a fast handover process during a handover initiated by a BS in an IEEE 802.16e communication system according to an embodiment of the present invention.

FIG. 5 is a signaling diagram illustrating a signaling procedure between an MSS and BSs for supporting fast handover of the MSS initiated by a BS in an IEEE 802.16e communication system according to an embodiment of the present invention. Referring to FIG. 5, if a serving BS 540 detects a need for a handover of an MSS 500 that it is managing in Step 511, the serving BS 540 starts a handover process initiated at the request of a BS. Accordingly, the serving BS 540 transmits HO_PRE_NOTIFICATION messages to neighbor BSs to which the MSS 500 will possibly be handed over in Steps 513, 515, and 517. It is assumed in FIG. 5 that the neighbor BSs of the serving BS 540 includes three BSs, i.e., a first target BS 560, a second target BS 580, and a third target BS 590.

Upon receiving the HO_PRE_NOTIFICATION message, each of the target BSs transmit a HO_PRE_NOTIFICATION_RESPONSE message to the serving BS 540 in Steps 519, 521, and 523. Thereafter, the serving BS 540 selects a target BS or target BSs that can support a bandwidth and a service level requested by the MSS 500. For example, if it is assumed that a service level supportable by the first target BS 560 and the second target BS 580 is higher than or equal to the service level requested by the MSS 500 and a service level supportable by the third target BS 590 is lower than the service level requested by the MSS 500, the serving BS 540 selects the first target BS 560 and the second target BS 580 as candidate target BSs.

The serving BS 540 creates a recommended list using the candidate target BSs, and transmits a MOB_BSHO_REQ message including the recommended list to the MSS 500 in Step 527. A format of the MOB_BSHO_REQ message used in this embodiment is shown in Table 16.

TABLE 16

| Syntax | Size | Notes |
| --- | --- | --- |
| MOB_BSHO_REQ_Message_Format( ) { | | |
|   Management Message Type = 52 | | |
|   reserved | 7 bits | |
|   HO_option | 1 bit | 0: Normal |
| | | 1: Fast (Network Assisted) |
|   For (j=0; j<N_Recommended; j++) { | | |
|     Neighbor BS-ID | 48 bits | |
|     Service level prediction | 8 bits | |
|   } | | |
| } | | |

Figure 1:
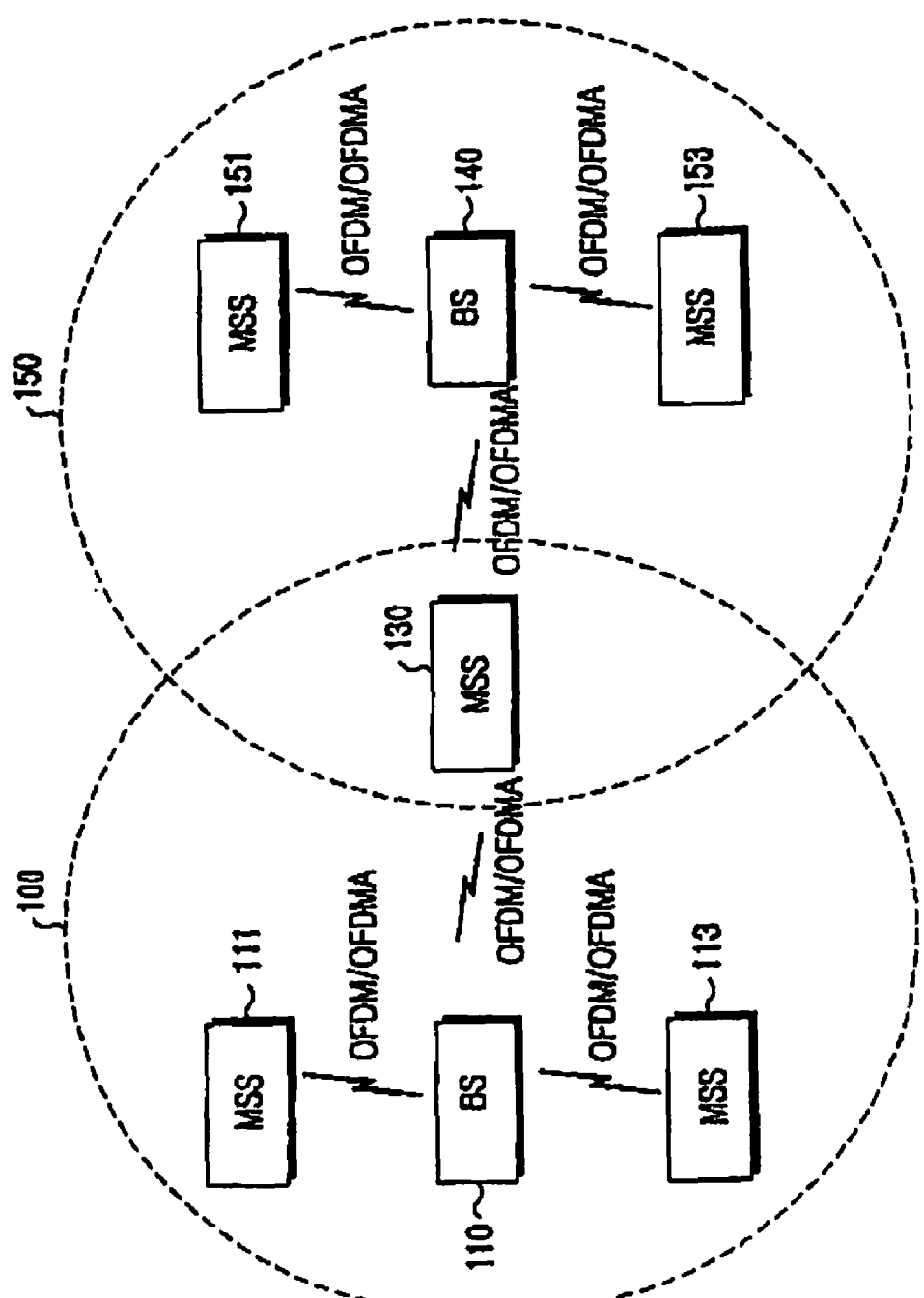
FIG. 1 is a diagram schematically illustrating a conventional IEEE 802.16e communication system.
Figure 2:
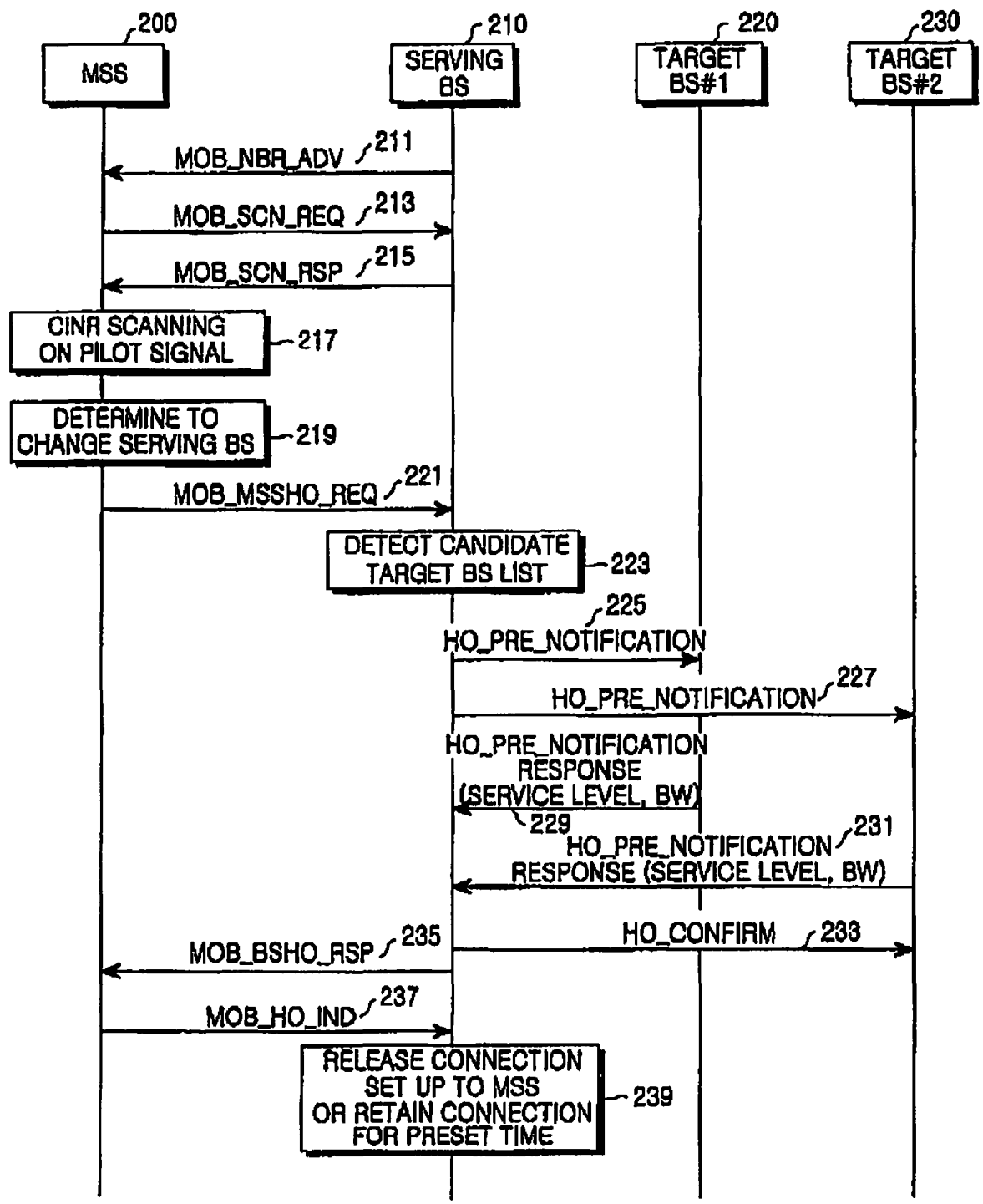
FIG. 2 is a signaling diagram illustrating a handover process initiated by an MSS in a conventional IEEE 802.16e communication system.
Figure 3:
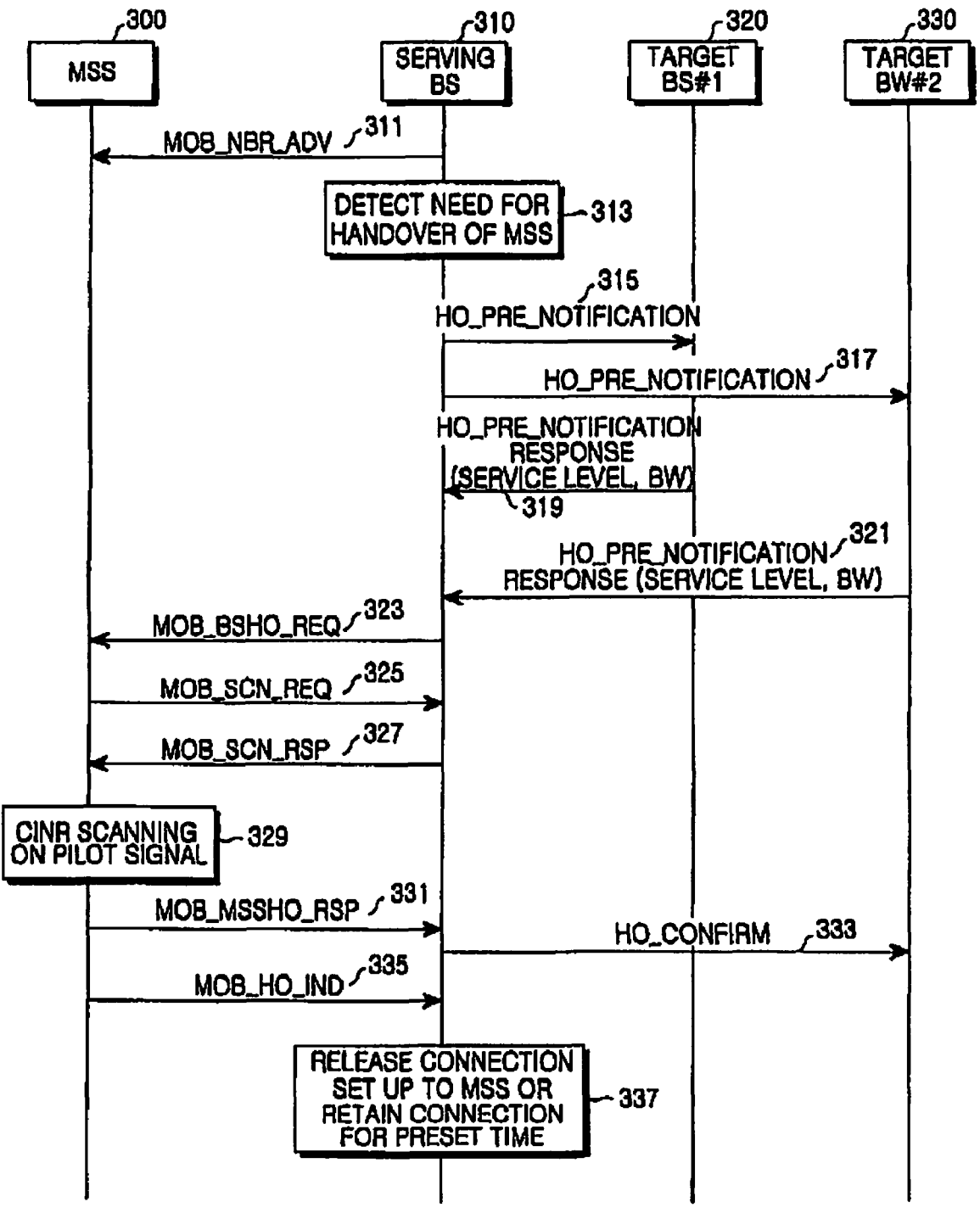
FIG. 3 is a signaling diagram illustrating a handover process initiated by a BS in a conventional IEEE 802.16e communication system.
Figure 4:
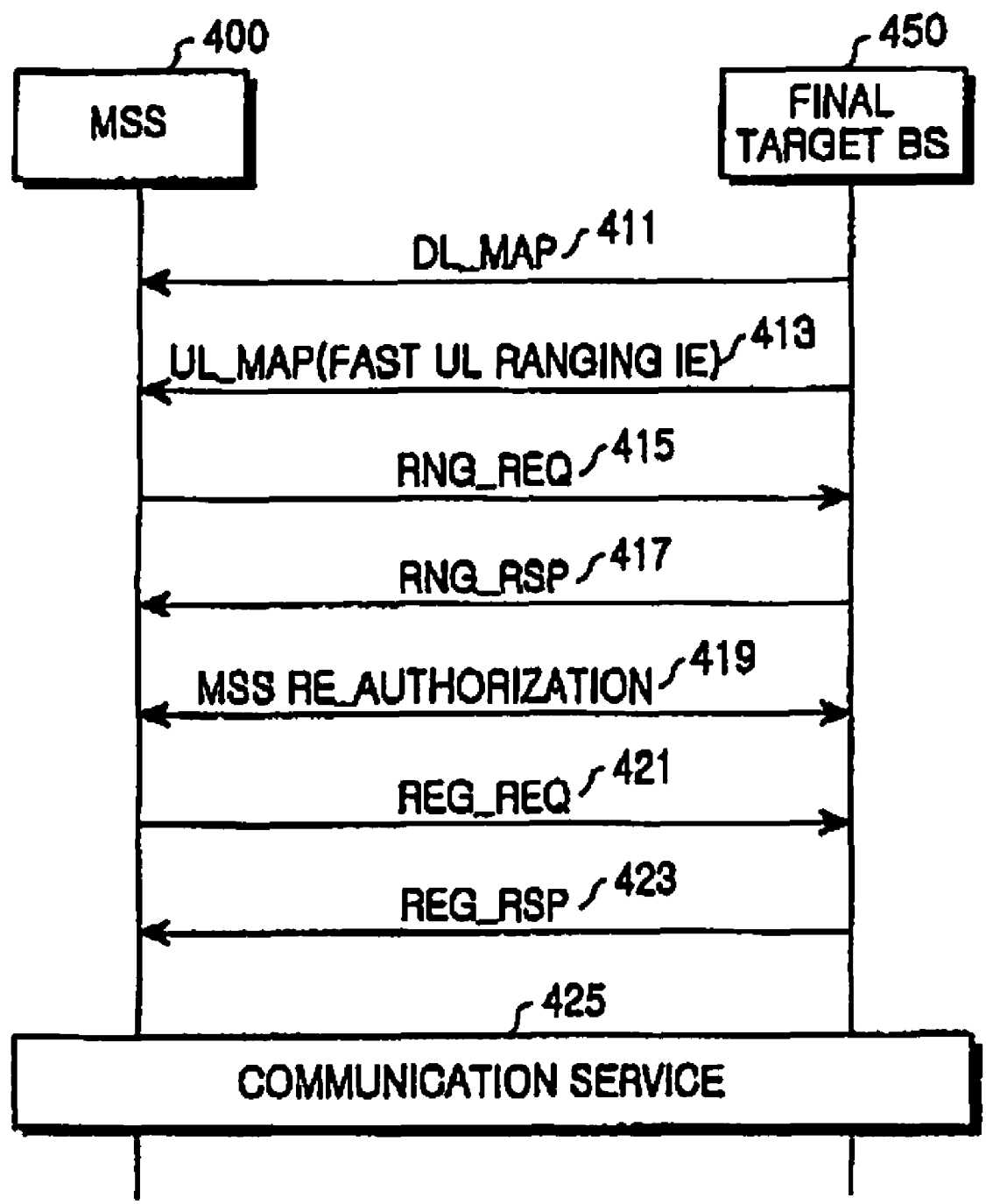
FIG. 4 is a signaling diagram illustrating a network re-entry process performed after a handover of an MSS in a conventional IEEE 802.16e communication system.

As shown in Table 16, compared with the conventional MOB_BSHO_REQ message of Table 11, the redefined MOB_BSHO_REQ message further includes a 1-bit HO_option field and a 7-bit reserved field. If a HO_option value of the redefined MOB_BSHO_REQ message is set to '0' (HO_option=0), the MSS 500 operates as when the conventional MOB_BSHO_REQ message is received, i.e., the procedure illustrated in FIG. 3. However, if the HO_option value is set to '1' (HO_option=1), the MSS 500 performs a fast (network assisted) handover process as proposed in the present invention.

The serving BS 540 transmits HO_CONFIRM messages of Table 8 to the target BSs included in the recommended list, i.e., the first and second target BSs 560 and 580, in Steps 525 and 529. Upon receiving the HO_CONFIRM messages, the first and second target BSs 560 and 580 each reserve a Fast UL Ranging IE for the MSS 500, and transmits a UL_MAP message including the Fast UL Ranging IE to the MSS 500 in Steps 535 and 537.

Optionally, in addition to the HO_CONFIRM messages, the serving BS 540 can transmit information needed for an operation of the MSS 500, stored therein, to the first and second target BSs 560 and 580 using backbone messages. Herein, the information needed for an operation of the MSS 500 refers to handover process optimization information such as service information of the MSS 500 and operational context information. Thereafter, the MSS 500, when it performs the handover to a BS included in the recommended list, can perform ranging with the corresponding BS for a fast ranging interval detected from a UL_MAP message. If a target BS to which the MSS 500 will be handed over has already acquired information on the MSS 500, the MSS 500 can perform a network re-entry process caused by handover more rapidly.

Although it is illustrated in FIG. 5 that the first and second target BSs 560 and 580 each transmit the Fast UL Ranging IE, after the MSS 500 performs carrier-to-interference and noise ratio (CINR) scanning on pilot channel signals from neighbor BSs in Step 533, the first and second target BSs 560 and 580 each can optionally transmit the Fast UL Ranging IE immediately after receiving the HO_CONFIRM messages. That is, the first target BS 560 can transmit the Fast UL Ranging IE to the MSS 500 after receiving the HO_CONFIRM message from the serving BS 540 in Step 525. Also, the second target BS 580 can transmit the Fast UL Ranging IE to the MSS 500 after receiving the HO_CONFIRM message from the serving BS 540 in Step 529.

Upon receiving the MOB_BSHO_REQ message with HO_option=1, the MSS 500 transmits a MOB_HO_IND message to the serving BS 540 in Step 531. Herein, a value recorded in a Target_BS_ID field of the MOB_HO_IND message can be either an identifier (ID) of a certain target BS or a value predefined between the target BS and the MSS 500. For example, 0x000000000000 or 0xffffffffffff can be used as the predefined value. When there are two or more recommended BSs for CINR scanning, the MSS 500 can write the predefined value in the Target_BS_ID field of the MOB_HO_IND message.

The conventional MOB_HO_IND message was used when an MSS informs a serving BS of a selected final target BS to which it will be handed over. Conventionally, therefore, the serving BS must receive the MOB_HO_IND message to perform handover of the MSS. However, even when a serving BS fails to receive a MOB_HO_IND message defined in the system supporting fast handover of an MSS according to the present invention or the MSS does not transmit the redefined MOB_HO_IND message to the serving BS, the present invention enables the MSS to perform a handover because a value recorded in a Target_BS_ID field of the redefined MOB_HO_IND message may not be an ID of a final target BS to which the MSS will perform handover.

After transmitting the MOB_HO_IND message, the MSS 500 performs CINR scanning on the BSs included in the recommended list in Step 533, and selects a best target BS (hereinafter referred to as a "new serving BS"). For example, if a CINR value for the second target BS 580 is the greatest among the scanned BSs, the MSS 500 can select the second target BS 580 as a new serving BS.

In a method proposed by the present invention, because the MSS 500 is not required to transmit the MOB_MSSHO_RSP message including CINR values for the recommended target BSs to the serving BS 540, after performing CINR scanning on pilot channel signals from the recommended target BSs, it is not necessary for the MSS 500 to perform CINR scanning on all BSs belonging to the recommended list. For example, assuming that there is a CINR threshold based on which the MSS 500 can perform handover, the MSS 500 first performs CINR scanning on the second target BS 580. If the scanning result value is sufficiently higher than the CINR threshold, such that a handover is possible, the MSS 500 is not required to perform CINR scanning on the first target BS 560.

Therefore, the MSS 500 can read a Fast UL Ranging IE allocated thereto by checking a UL_MAP message broadcasted by the second target BS 580 and start a network re-entry process by transmitting a Ranging Request (RNG_REQ) message to the second target BS 580.

In the network re-entry process, the MSS 500 returns to the serving BS 540 after CINR scanning, acquires synchronization with the serving BS 540, and performs a ranging process, thereby reducing a time required for transmitting the MOB_MSSHO_RSP message and the MOB_HO_IND message. In addition, the MSS 500 starts the network re-entry process immediately after early completion of CINR scanning, without performing CINR scanning on all target BSs included in the recommended list, thereby contributing to additional time saving.

After completing the CINR scanning, the MSS 500 receives the Fast UL Ranging IE transmitted by the second target BS 580 that is selected as a new serving BS in Step 537, and performs a network re-entry process with the second target BS 580 in Steps 539, 541, and 543.

Upon receiving a request for authentication on the MSS 500 from the second target BS 580, which is a new serving BS of the MSS 500, the serving BS 540 recognizes that the MSS 500 is performing handover to the second target BS 580. The serving BS 540 transmits a handover withdraw (HO_WITHDRAW) message to each of the remaining recommended BSs in the recommended list (, except the second target BS 580, which is the new serving BS, in Step 545. A format of the HO_WITHDRAW message is shown in Table 17.

TABLE 17

| Field | Size | Notes |
| --- | --- | --- |
| Global Header | 152-bit | |
| For (j=0; j<Num_Records; j++) { | | |
|   MSS unique identifier | 48-bit | 48-bit general purpose MAC address for MSS |
| } | | |
| Security field | TBD | Used for authenticating this message |

Because it is assumed in FIG. 5 that the recommended list includes the first target BS 560 and the second target BS 580, the HO_WITHDRAW message is transmitted only to the first target BS 560.

Upon receiving the HO_WITHDRAW message, the first target BS 560 releases a reserved uplink resource by deleting the Fast UL Ranging IE for the MSS 500. The serving BS 540 can transmit the HO_WITHDRAW message at any time after the time at which it recognizes that the MSS 500 has selected the second target BS 580 as its final target BS.

For example, the serving BS 540 can transmit the HO_WITHDRAW message using an authentication-related HMAC Tuple field included in the MOB_HO_IND message at the time when it responds to the request for authentication on the MSS 500 from the second target BS 580. Alternatively, if the MSS 500 completes the network re-entry process to the second target BS 580, which is its new serving BS, the serving BS 540 can transmit the HO_WITHDRAW message, upon receiving a backbone message that the second target BS 580 transmits to inform neighbor BSs of the completed handover of the MSS 500.

Furthermore, if the first target BS 560 excluded from the handover target BSs fails to receive the RNG_REQ message from the MSS 500 for a predetermined time, the MSS 500 may release the Fast UL Ranging IE allocated thereto. Although the old serving BS 540 transmits the HO_WITHDRAW message using the method of releasing the Fast UL Ranging IE in the embodiment of the present invention, the message can be transmitted in another method.

Figure 6:
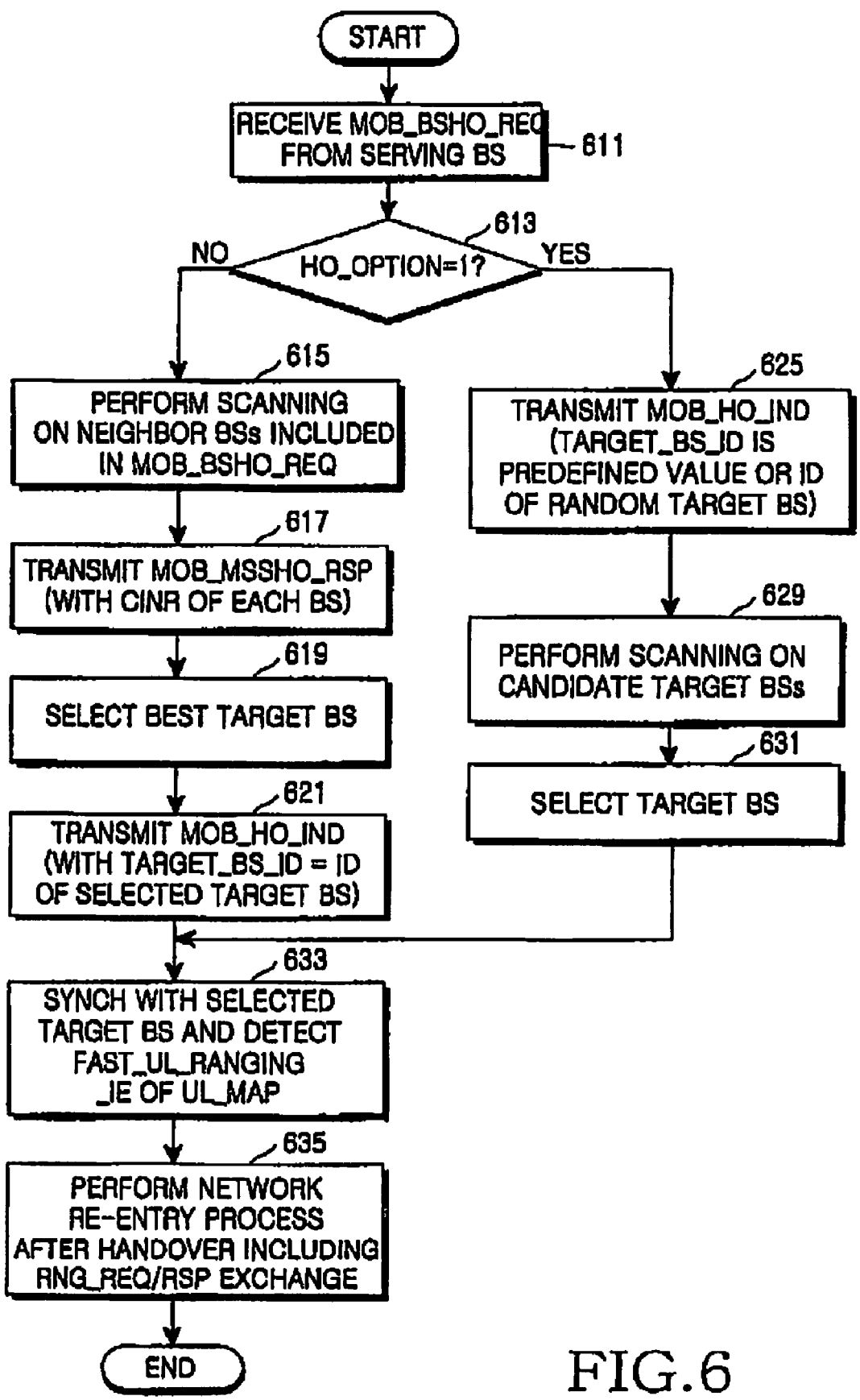
FIG. 6 is a flowchart illustrating a fast handover process of an MSS initiated by a BS in an IEEE 802.16e communication system according to an embodiment of the present invention.

FIG. 6 is a flowchart illustrating a handover process of an MSS initiated by a BS in an IEEE 802.16e communication system according to an embodiment of the present invention. Referring to FIG. 6, in step 611, the MSS receives a MOB_BSHO_REQ message for requesting handover from a serving BS. In step 613, if a value recorded in a HO_option field included in the MOB_BSHO_REQ message is set to '1', the MSS recognizes that it can perform fast handover, and then performs steps 625 and the following process, which is a fast handover process. However, if the value recorded in the HO_option field is set to '0', the MSS performs step 615 and the following process, which is the conventional handover process.

In step 615, the MSS performs CINR scanning on each of pilot channel signals from recommended BSs included in the MOB_BSHO_REQ message. In step 617, the MSS transmits a MOB_MSSHO_RSP message to its serving BS. Herein, the MOB_MSSHO_RSP message includes the CINR values for the scanned BSs.

In step 619, the MSS selects a new serving BS among the scanned BSs. For example, the MSS can select a BS, a CINR value for which is greatest, as the new serving BS. In step 621, the MSS transmits a MOB_HO_IND message including a predefined value between the MSS and the serving BS. Herein, the MSS may not transmit the MOB_HO_IND message to the serving BS.

In step 633, the MSS acquires synchronization with the new serving BS, and acquires network re-entry process-related information by receiving a UL_MAP message. For example, the MSS can perform a ranging process with the new serving BS on a contention-free basis by detecting a Fast UL Ranging IE included in the UL_MAP message. In step 635, the MSS performs a network re-entry process with the selected target BS, i.e., the new serving BS, to resume a communication service.

Alternatively, in step 625, the MSS transmits a MOB_HO_IND message with HO_IND_type=0 and Target_BS_ID='predefined value' to the serving BS. Herein, the predefined value means, for example, 0x000000000000 or 0xffffffffffff other than one of IDs of BSs supporting fast handover. That is, the MSS can select a random BS among BSs supporting fast handover and set the Target_BS_ID to an ID value of the selected BS.

In step 629, the MSS performs CINR scanning on the target BSs recommended by the serving BS. In step 631, the MSS selects a new serving BS according to the scanning result, and then performs steps 633 and 635. The MSS can select the new serving BS by performing CINR scanning on each of the recommended BSs.

Alternatively, the MSS can perform CINR scanning on a random recommended BS and, if the scanning result satisfies a predetermined condition, select the random recommended BS as the new serving BS after stopping CINR scanning on the remaining recommended BSs.

Figure 7:
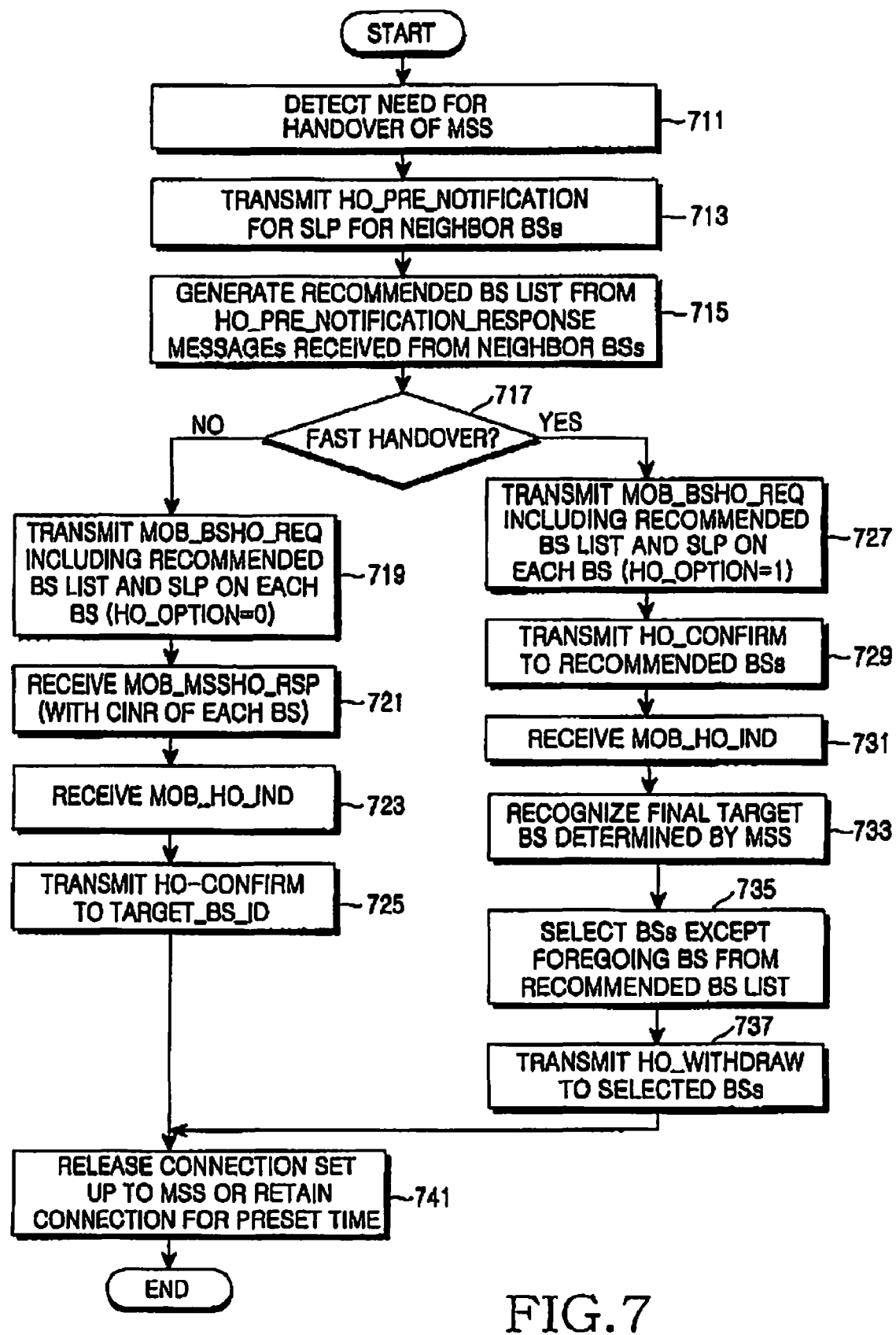
FIG. 7 is a flowchart illustrating an operation of a serving BS during a handover initiated by a BS in an IEEE 802.16e communication system according to an embodiment of the present invention.

FIG. 7 is a flowchart illustrating an operation of a serving BS during a handover initiated by a BS in an IEEE 802.16e communication system according to an embodiment of the present invention. Referring to FIG. 7, in step 711, the serving BS detects a need for handover of a particular MSS. In step 713, the serving BS transmits a HO_PRE_NOTIFICATION message to each of neighbor BSs to determine if the neighbor BSs can support a service level requested by the MSS. In step 715, the serving BS generates a recommended-BS list using HO_PRE_NOTIFICATION_RESPONSE messages received from the neighbor BSs in response to the HO_PRE_NOTIFICATION message. In step 717, if the serving BS can support fast handover for the MSS, the serving BS proceeds to step 727. However, if the serving BS cannot support fast handover for the MSS, it proceeds to step 719.

In step 719, the serving BS transmits a MOB_BSHO_REQ message including the generate recommended-BS list and service level prediction (SLP) information of each of the recommended BSs to the MSS. In step 721, the serving BS receives an MOB_MSSHO_RSP message including CINR canning result for each of the recommended BSs from the MSS. In step 723, the serving BS receives an MOB_HO_IND message including an ID of a target BS selected by the MSS, i.e., a new serving BS. In step 725, the serving BS transmits a HO_CONFIRM message to the new serving BS. In step 741, the serving BS releases information on a connection set up to the MSS or retains the connection information for a predetermined time.

In step 727, the serving BS transmits a MOB_BSHO_REQ message including the generated recommended-BS list and SLP information of each of the recommended BSs to the MSS. A HO_option field in the MOB_BSHO_REQ message is set to '1'.

In step 729, the serving BS transmits a HO_CONFIRM message to each of the recommended BSs. In step 731, the serving BS receives a MOB_HO_IND message from the MSS. In step 733, the serving BS recognizes that the MSS has selected a new serving BS. As described above, a time at which the serving BS transmits a HO_WITHDRAW message is possible any time after the time at which it recognizes that the MSS has selected the new serving BS. Therefore, the serving BS can transmit the HO_WITHDRAW message using an authentication-related HMAC Tuple field included in the MOB_HO_IND message at the time when it responds to a request for authentication on the MSS from the new serving BS selected by the MSS.

Alternatively, if the MSS completes a network re-entry process to the new serving BS, the new serving BS transmits a backbone message indicating the completed handover of the MSS to each of neighbor BSs. The serving BS can also transmit the HO_WITHDRAW message to BSs in the recommended-BS list, except the new serving BS, upon receiving the backbone message. Therefore, in step 735, the serving BS selects BSs, not including the final target BS, among the BSs in the recommended-BS list.

In step 737, the serving BS transmits the HO_WITHDRAW message to the selected BSs, i.e., target BSs. Upon receiving the HO_WITHDRAW message, the target BSs release a Fast UL Ranging IE allocated to the MSS, and delete any handover process information of the MSS stored therein.

Figure 8:
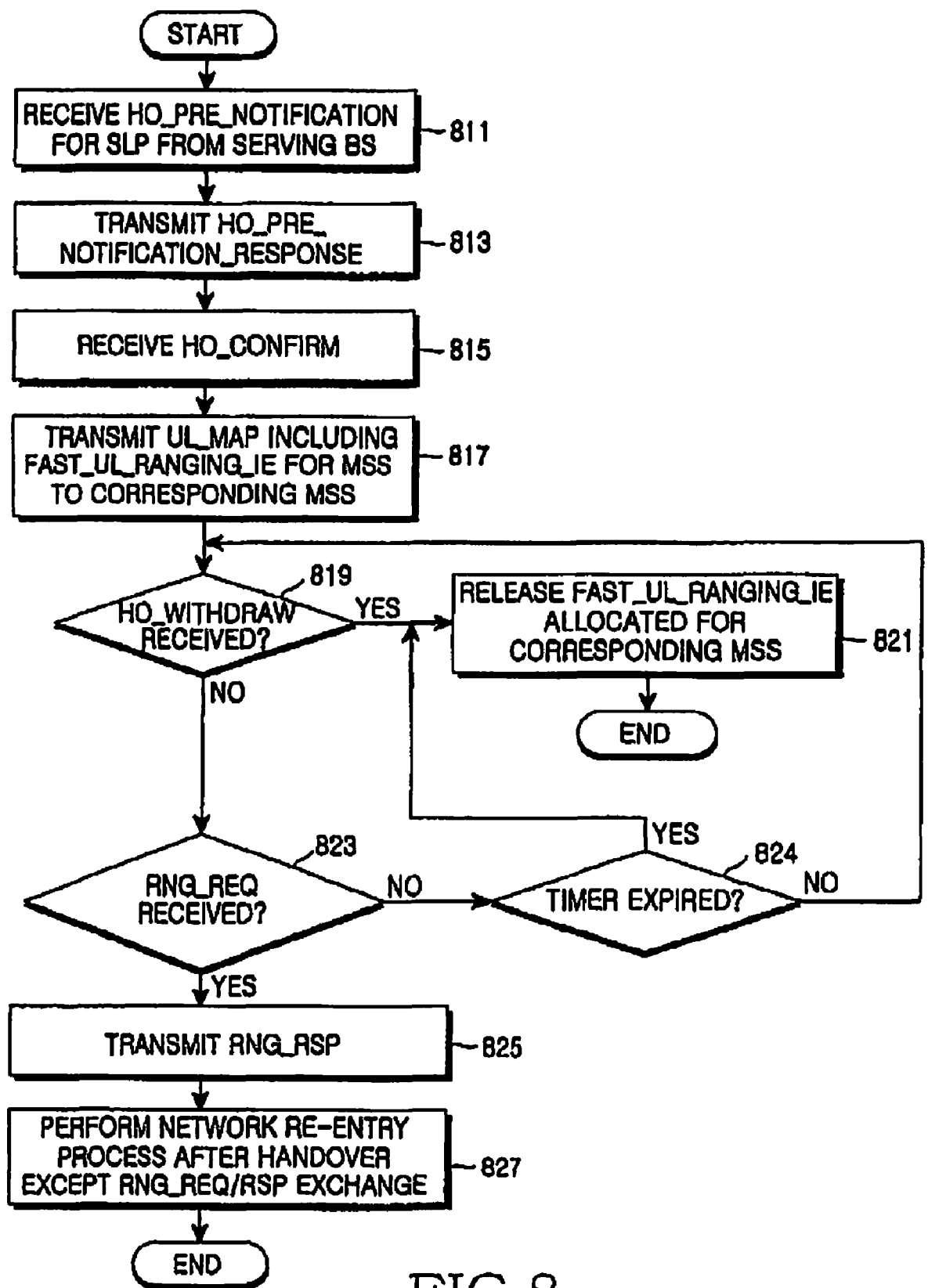
FIG. 8 is a flowchart illustrating an operation of a target BS during a handover process initiated by a BS in an IEEE 802.16e communication system according to an embodiment of the present invention.

FIG. 8 is a flowchart illustrating an operation of a target BS during handover initiated by a BS in an IEEE 802.16e communication system according to an embodiment of the present invention. Referring to FIG. 8, in step 811, the target BS receives a HO_PRE_NOTIFICATION message for requesting SLP for a particular MSS from a serving BS. In step 813, the target BS transmits a HO_PRE_NOTIFICATION_RESPONSE message to the serving BS in response to the HO_PRE_NOTIFICATION message. In step 815, the target BS receives a HO_CONFIRM message from the serving BS. In step 817, the target BS transmits a UL_MAP message including a Fast UL Ranging IE to the MSS.

In step 819, the target BS determines if it receives a HO_WITHDRAW message from the serving BS. If it is determined that the HO_WITHDRAW message is received, the target BS proceeds to step 821 where it releases the Fast UL Ranging IE allocated to the MSS.

However, upon failure to receive the HO_WITHDRAW message, the target BS determines in step 823 if it receives an RNG_REQ message from the MSS. If it is determined that the RNG_REQ message is received, the target BS proceeds to step 825, where it transmits an RNG_RSP message to the MSS in response to the RNG_REQ message.

In step 827, the target BS performs a network re-entry process except a ranging process, with the MSS.

Upon failure to receive the RNG_REQ message in step 823, the target BS proceeds to step 824, where it determines if a timer set for releasing a Fast UL Ranging IE has expired. If it is determined that the timer has expired, the target BS proceeds to step 821, where it releases the Fast UL Ranging IE. However, if the timer has not expired yet, the target BS returns to step 819 where it awaits a HO_WITHDRAW message.

As can be understood from the foregoing description, a proposed BWA communication system using an OFDM/OFDMA scheme supports fast handover to an MSS at the handover request of a serving BS to omit a part of the conventional handover process, thereby contributing to a reduction in handover processing time. More specifically, it is possible to exclude one process in which the MSS transmits a handover response message to the serving BS and another process in which the MSS acquires synchronization with the serving BS and performs ranging with the serving BS after performing CINR scanning to transmit the handover response message. The exclusion of these processes reduces the time required for the processes, thereby reducing the overall time required for the handover process initiated by the BS.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A Broadband Wireless Access (BWA) communication system comprising:
   a Mobile Subscriber Station (MSS); and
   a serving Base Station (BS) for transmitting, to the MSS, a handover request message including information on at least one recommended BS to which the MSS can perform handover, among a plurality of neighbor BSs of the serving BS, and an information field indicating whether a network assisted handover is supported, receiving, from the MSS, a handover indication message including an IDentifier (ID) field of a target BS, receiving information indicating a completion of a handover process of the MSS from a selected target BS determined by the MSS among the at least one recommended BS, and transmitting a notification for ordering a release of a resource allocated to the MSS, to the other at least one recommended BS, excluding the selected target BS from the at least one recommended BS,
   wherein the network assisted handover indicates that the MSS may perform a handover to the selected target BS among the at least one recommended BS without notifying the serving BS of the selected target BS, and
   wherein the ID field of the handover indication message is set to a predefined value that does not indicate a certain target BS, when the information field indicates the network assisted handover is supported.

2. The system of claim 1, wherein the serving BS receives an authentication request for the MSS from the selected target BS determined by the MSS handover among the at least one recommended BS.

3. A Broadband Wireless Access (BWA) communication system comprising:
   a serving Base Station (BS); and
   a Mobile Subscriber Station (MSS) for receiving, from the serving BS, a handover request message including information on at least one recommended BS to which the MSS can perform handover, among a plurality of neighbor BSs of the serving BS, and an information field indicating whether a network assisted handover is supported, transmitting, to the serving BS, a handover indication message including an IDentifier (ID) field of a target BS, receiving, from the at least one recommended BS, a ranging resource for the network assisted handover of the MSS, transmitting, to a selected target BS among the at least one recommended BS, a ranging request message, and receiving, from the selected target BS, a ranging response message,
   wherein the network assisted handover indicates that the MSS may perform a handover to the selected target BS among the at least one recommended BS without notifying the serving BS of the selected target BS, and
   wherein the ID field of the handover indication message is set to a predefined value that does not indicate a certain target BS, when the information field indicates the network assisted handover is supported.

4. The system of claim 3, wherein the selected target BS is determined by measuring channel quality for each of the at least one recommended BS and determining a BS having the highest channel quality as the selected target BS.

5. The system of claim 3, wherein the MSS transmits, to each of the at least one recommended BS, a handover message indicating that the MSS will perform the network assisted handover, when the information field indicates the network assisted handover is supported.

6. An apparatus for performing a handover of a Mobile Subscriber Station (MSS) in a serving Base Station (BS) of a Broadband Wireless Access (BWA) communication system, the apparatus comprising:
   a transmitter for transmitting, to the MSS, a handover request message including information on at least one recommended BS to which the MSS can perform handover, from among a plurality of neighbor BSs of the serving BS, and an information field indicating whether a network assisted handover is supported; and
   a receiver for receiving, from the MSS, a handover indication message including an IDentifier (ID) field of a target BS, and receiving information indicating a completion of a handover process of the MSS from a selected target BS determined by the MSS among the at least one recommended BS,
   wherein the transmitter transmits a notification for ordering a release of a resource allocated to the MSS, to the other at least one recommended BS, excluding the selected target BS from the at least one recommended BS,
   wherein the network assisted handover indicates that the MSS may perform a handover to the selected target BS among the at least one recommended BS without notifying the serving BS of the selected target BS, and
   wherein the ID field of the handover indication message is set to a predefined value that does not indicate a certain target BS, when the information field indicates the network assisted handover is supported.

7. The apparatus of claim 6, wherein the receiver receives an authentication request for the MSS from the selected target BS determined by the MSS handover among the at least one recommended BS.

8. An apparatus for performing a handover in a Mobile Subscriber Station (MSS) of a Broadband Wireless Access (BWA) communication system, the apparatus comprising:
   a receiver for receiving, from a serving Base Station (BS), a handover request message including information on at least one recommended BS to which the MSS can perform handover, from among a plurality of neighbor BSs of the serving BS, and an information field indicating whether a network assisted handover is supported; and a transmitter for transmitting, to the serving BS, a handover indication message including an IDentifier (ID) field of a target BS, wherein the receiver receives, from the at least one recommended BS, ranging resource for the network assisted handover of the MSS, the transmitter transmits, to a selected target BS among the at least one recommended BS, a ranging request message, and the receiver receives, from the selected target BS, a ranging response message, wherein the network assisted handover indicates that the MSS is permitted to perform a handover to the selected target BS among the at least one recommended BS without notifying the serving BS of the selected target BS, and wherein the ID field of the handover indication message is set to a predefined value that does not indicate a certain target BS, when the information field indicates the network assisted handover is supported.

9. The apparatus of claim 8, wherein the selected target BS is determined by measuring a channel quality for each of the at least one recommended BS and determining a BS having the highest channel quality as the selected target BS.

10. The apparatus of claim 8, wherein the transmitter transmits, to each of the at least one recommended BS, a handover message indicating that the MSS will perform the network assisted handover, when the information field indicates the network assisted handover is supported.

* * * * *